United States Patent

[11] 3,562,493

[72] Inventors Bernard J. Malkowski
Dearborn Heights;
John E. Hylan, Birmingham, Mich.
[21] Appl. No. 684,68[illegible]
[22] Filed Nov. 21, 1967
[45] Patented Feb. 9, 1971
[73] Assignee Burroughs Corporation
Detroit, Mich.
a corporation of Michigan

[54] PERFORATED TAPE READER
8 Claims, 7 Drawing Figs.

[52] U.S. Cl. .......... 235/61.11, 178/112; 197/20
[51] Int. Cl. .......... B41j 5/36, G06k 7/04; G11b 23/00
[50] Field of Search .......... 235/61.111, 61.112, 61.113, 61.11; 197/20, 98; 178/112

[56] References Cited

UNITED STATES PATENTS 1,962,750 6/1934 Read .......... 235/61.11(3)
2,619,532 11/1952 Blodgett .......... 235/61.11(3)

*Primary Examiner*—Maynard R. Wilbur
*Assistant Examiner*—Thomas J. Sloyan
*Attorneys*—Kenneth L. Miller, Wallace P. Lamb, Paul W. Fish and Edwin W. Uren

ABSTRACT: A reader for reading information represented by apertures in a tape, the apertures being arranged in the form of a binary code. The tape is step fed to a reading station to present the tape apertures to a plurality of sensing pins which are biased to sense the presence and absence of tape apertures at the station. The pins are alternately released and retracted by cyclically operable means, and movable with the pins are interposers in the form of arms which are individually fulcrumed to pivot relative to the pins. Those ones of the pins which sense tape apertures, allow the interposers to move into effective positions where they are rockable by a second cyclically operable means, the rocking of the interposers indicating the sensing of tape apertures at the station. The rocking interposers move corresponding ones of code bars which rotate bails to activate transducers, thus converting a mechanical reading of information apertures to electrical signals.

PATENTED FEB 9 1971

INVENTORS
BERNARD J. MALKOWSKI
BY JOHN E. HYLAN

Paul W. Fish
ATTORNEY

PERFORATED TAPE READER

BRIEF DESCRIPTION OF THE INVENTION

The invention relates generally to apparatus for reading and converting perforated tape information and particularly to a mechanical tape reader.

BACKGROUND

As is known in the data processing and computer arts it is often desirable to enter information into the apparatus at the beginning and at various times during the operation of the machine. Various types of input devices are known which convert the information to be read into the machine into a machine recognizable language. Of the input devices well known in the art, the keyboard, the tape reader and the card reader are probably among the most widely used. In each of these input devices it is common in their operation to convert information into a machine recognizable language or code by sensing the position of mechanically positionable code bail members and converting this position into a multilevel electrical code signal.

To extend the versatility of various data processing apparatus it is often desirable to employ a plurality of input devices so that information may be read into a machine from any one of a number of sources. In prior art systems employing a plurality of input devices, it has been common practice to employ a number of separate input devices which are in essence functionally independent of the other input devices. This functional independence of the prior art input devices resulted in needless duplication of many structural features of the input devices. For example, each keyboard and card reader require a separate set of code bails and a transducer and this duplication in structure naturally resulted in greatly increased costs for the overall system.

It is therefore an object of the present invention to simplify the mechanical structure of multimode input devices for electronic data processing apparatus.

It is a further object of the present invention to functionally interrelate mechanical elements of input devices, utilized to provide multimode input capabilities, to data processing apparatus.

It is a further object of the present invention to provide an improved, low cost multifunction input device for data processors and the like.

It is yet another object of the present invention to provide an improved perforated tape reader.

DETAILED DESCRIPTION OF THE INVENTION

In accomplishing the above objects and other desirable aspects applicants have invented a novel encoding mechanism whereby any one of a plurality of separate, operationally independent input devices may be employed to selectively position a common set of code bails. A single transducer encoding device is employed to sense the selectively positioned code bails in response to the operation of one of the input devices. In response to the sensing of the respective position of the code bails the encoding device generates coded information signals in a machine recognizable code corresponding to the input from the operated input device. In accordance with the preferred embodiment of the present invention a single set of elongated code bails are directly actuatable by independent sets of interposers operatively associated with the respective input devices and cooperably juxtapositioned with the code bails.

In accomplishing other object applicants have invented a novel perforated tape reader comprising interposer members each having a plurality of degrees of freedom. A plurality of feeler pins are arranged to move under bias to sense the information levels of the portion of the tape at the sensing station. A like plurality of essentially J-shaped interposer members individually carry individual ones of said pins and are thus arranged to sense the extent of travel of the individual pins. The full permitted travel of a pin under bias, as determined by the presence rather than absence of an information aperture in the tape, cooperably position the interposer with a code slide or bar. The rotation of the interposer in the extended position drives the associated code slide to the driven position thereby selectively positioning lugs or stops which control the positioning of ones of code bails during the encoding operation.

For a more complete understanding of applicants' invention, reference may be had to the following detailed description in conjunction with the drawings wherein.

Figure 3:
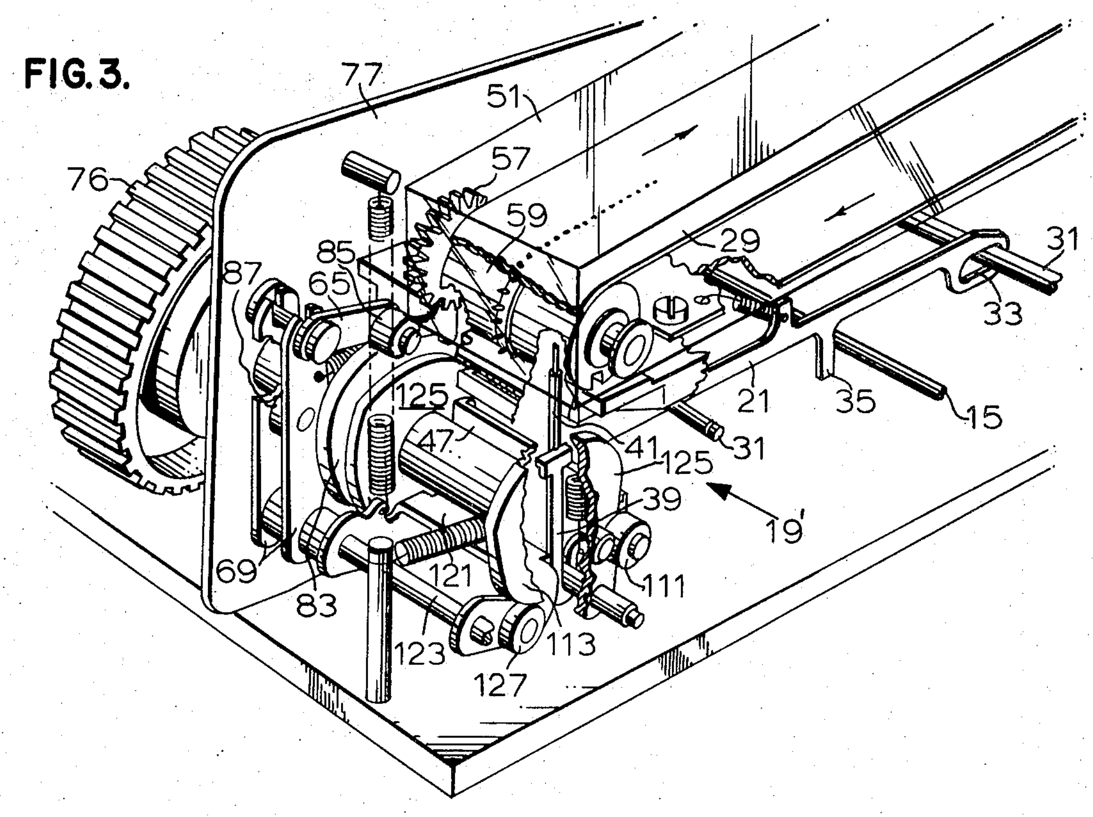
FIG. 3 is an isometric view of a perforated tape reader embodying one aspect of the principles of applicants' invention.
Figure 6:
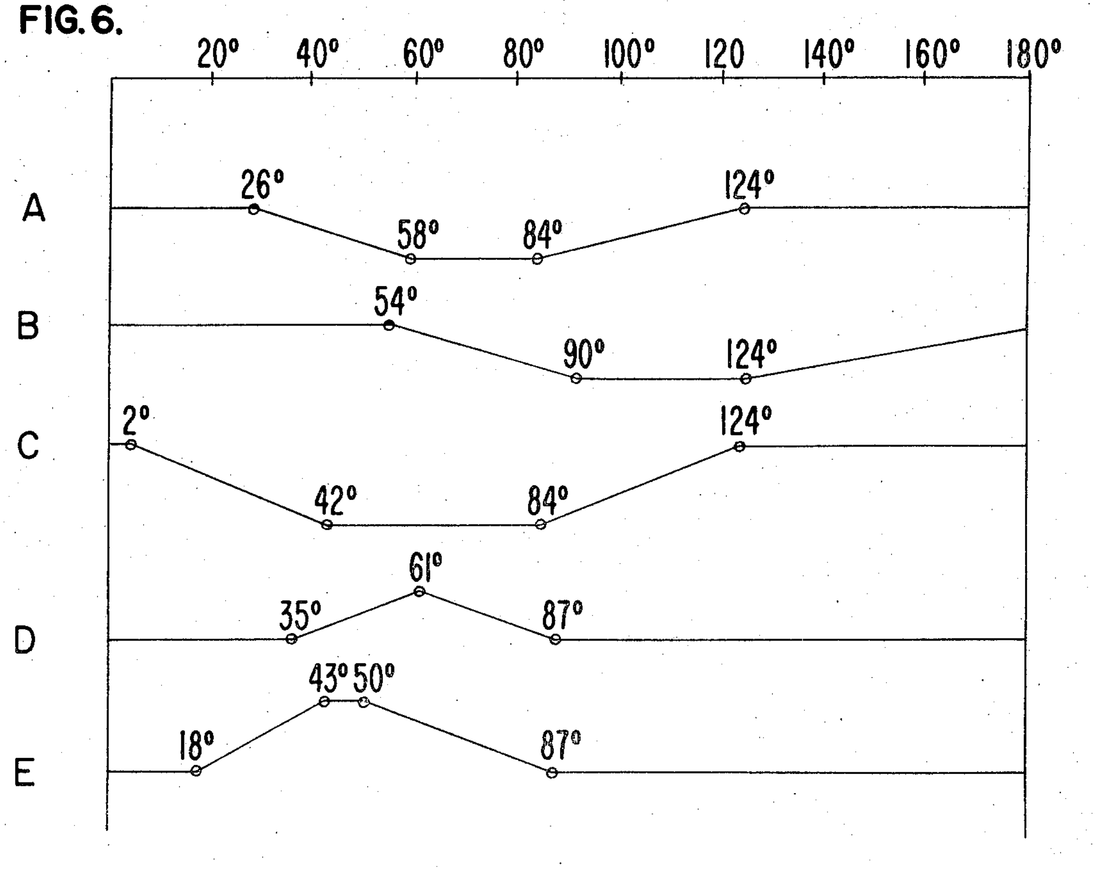
Figure 4:
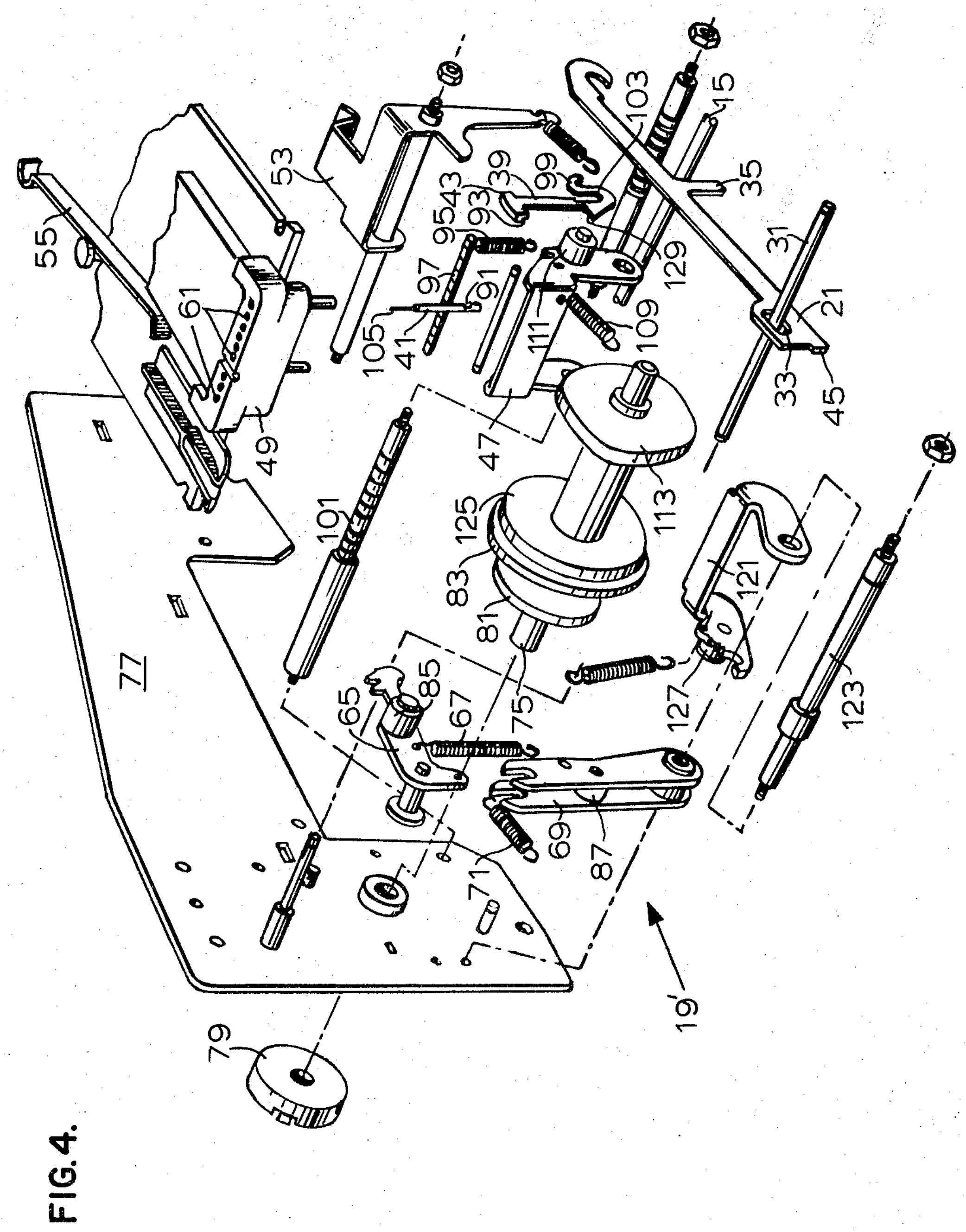
FIG. 4 is an exploded view of applicants' tape reader in accordance with one aspect of the present invention.
Figure 5A:
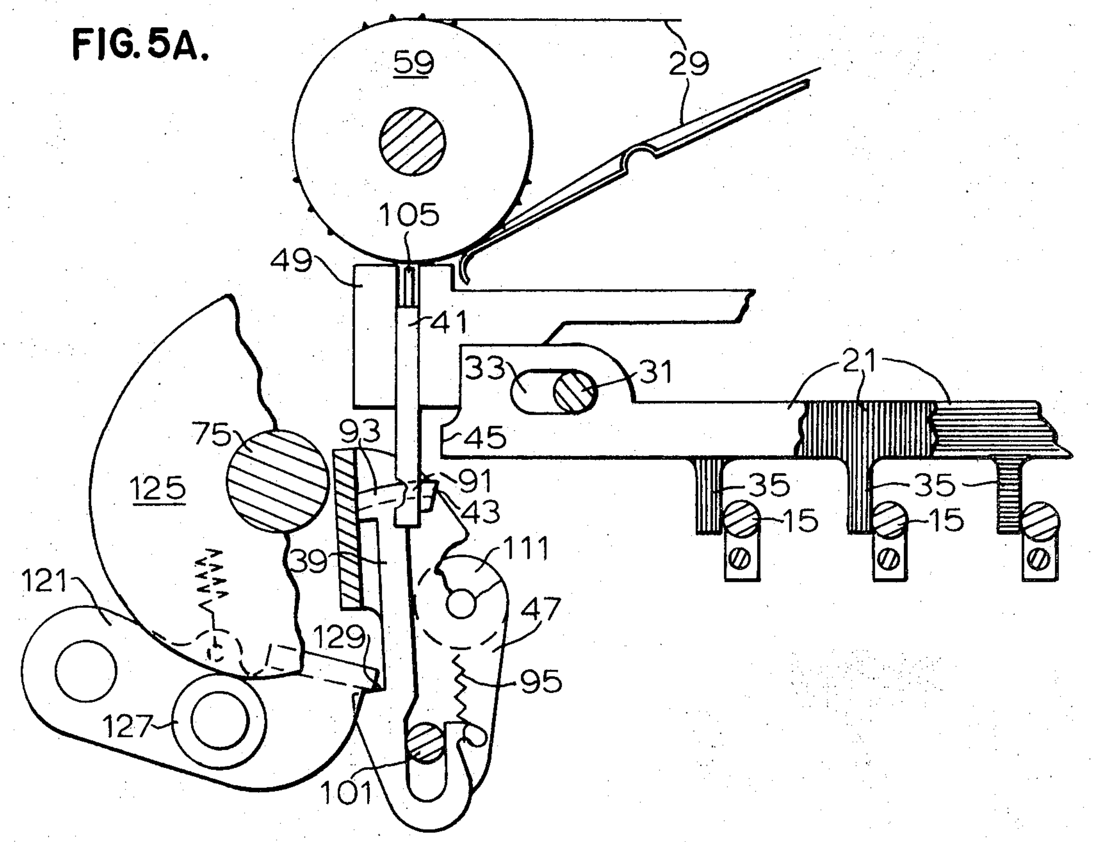
Figure 5B:
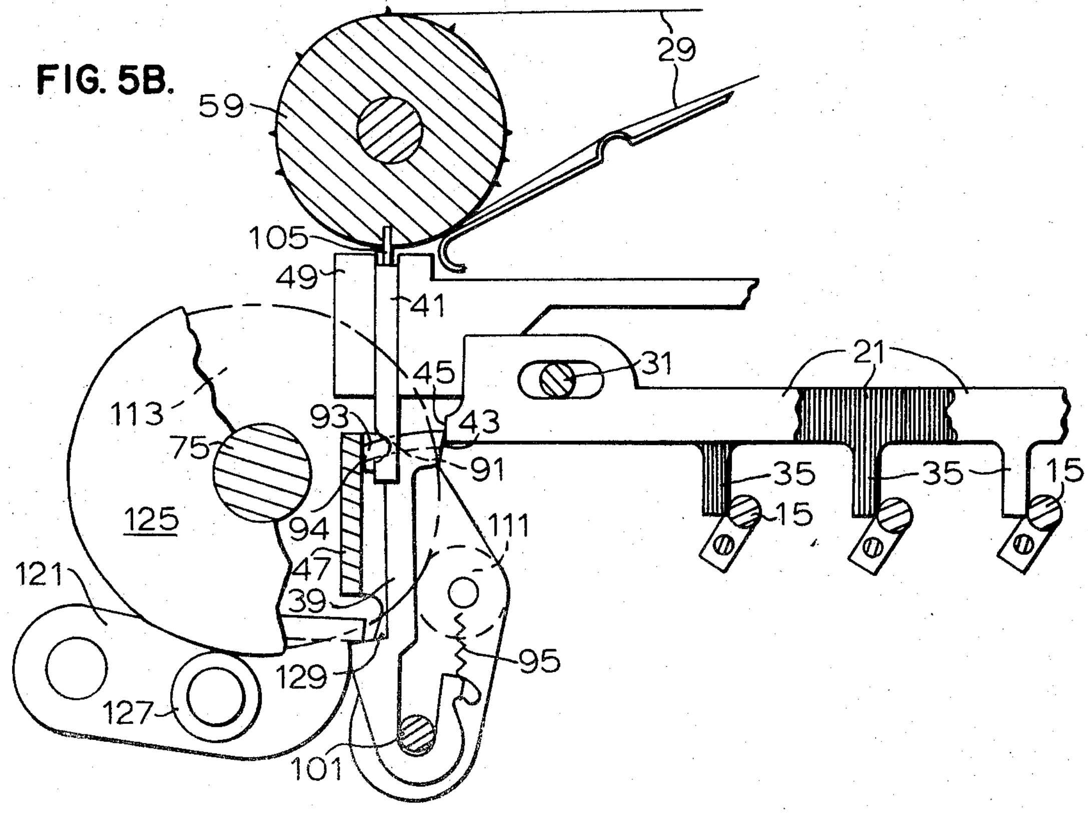

FIGS. *5a* and *5b* illustrate details of the interposer-feeler mechanisms of applicants' tape reader; and FIG. 6 is a timing diagram of applicants' tape reader illustrated in FIGS. 3 and 4.

Figure 1:
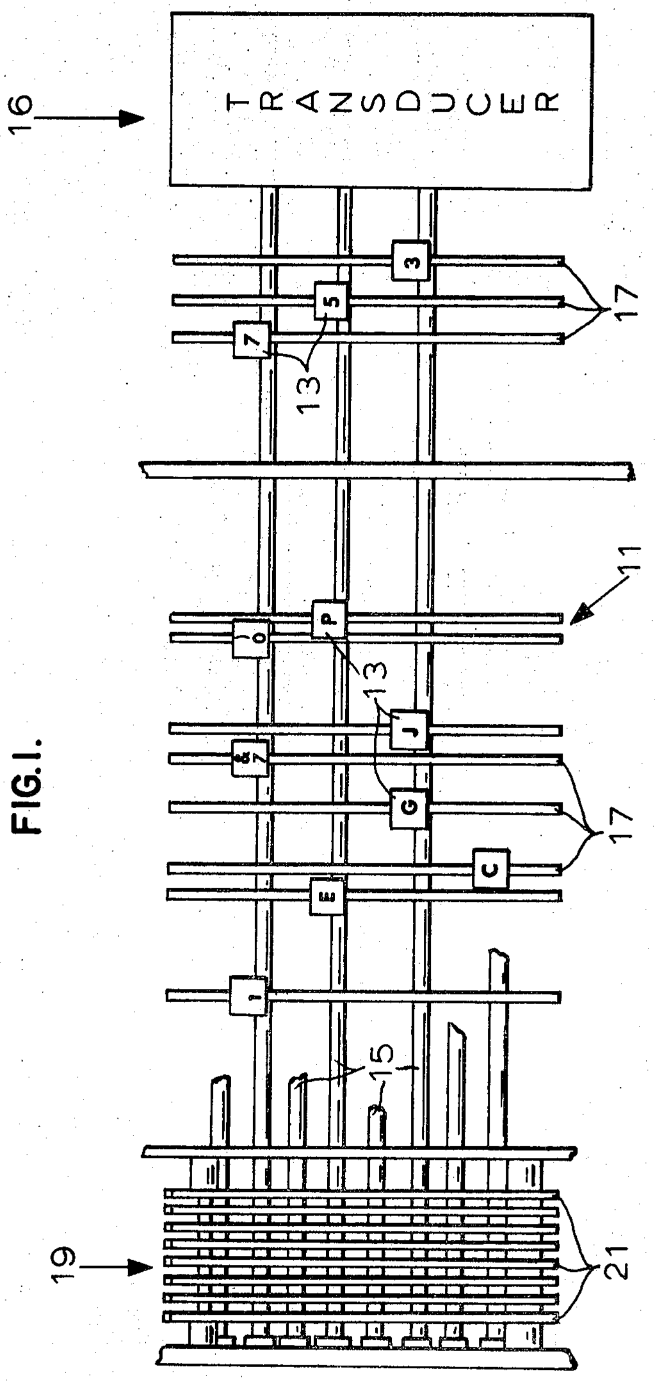
FIG. 1 is a schematic plan view of a multimode combined keyboard-tape reader input device in accordance with a first aspect of the principles of the applicants' invention.

Referring now to FIG. 1 there is shown a schematic illustration of a multimode input device embodying the principles of the present invention. A keyboard section 11 is provided with a standard arrangement of keys 13. The various keys 13, only a few of which are illustrated, are manually operable to control the positioning of code bails 15 against bias. As hereinafter to be more fully explained the operation of a key 13 controls the positioning of the key interposers 17. The position of the code bails 15 when driven or rocked against bias during an encoding operation is determined by lugs or stops carried by the key interposers 17 thereby defining the character corresponding to the operated key. This unique mechanical positioning of the interposers 17 and thus the determination of the position of the code bails 15 permits a mechanical to electrical transducer 16 to generate an electrical signal corresponding to the key depressed. The transducer 16 may be of any type known in the art, for example, photoelectric or magnetic. In the magnetic embodiment of the transducer, the bails 15 may carry a magnetic shunt or shield which is selectively positioned in or out of operable position with, for example, a biasing magnet and an associated magnetic core.

Tape reader section 19, is positioned in line with and proximate to keyboard section 11. Tape reader 19 is arranged to accept information in recorded form and convert it via the transducer 16 responsive to the code bails 15 into machine recognizable language. As is known in the art such tape readers may comprise magnetic tape readers or perforated tape readers. In the preferred embodiment shown the perforated tape reader 19 includes a plurality of stops or lugs carried by code bars 21. In operation the code bars are positioned according to information read from the tape to selectively determine to the position to which the code bails 15 are driven in an encoding operation. As is hereinafter to be more fully explained the tape reader 19 and keyboard 11 are arranged to control the mechanical position to which the common set of code bails 15 may be driven or rocked during an encoding cycle.

Figure 2:
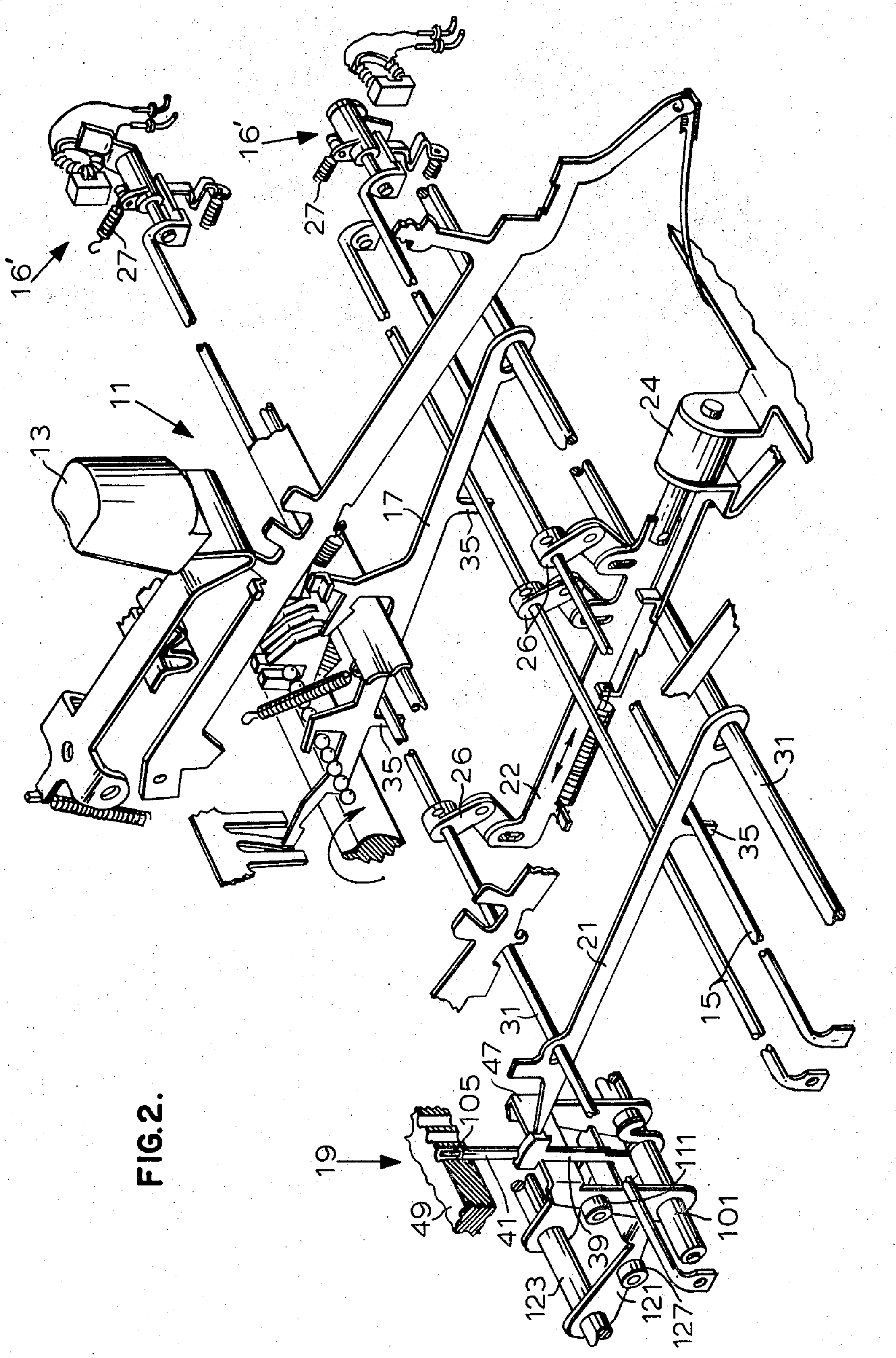
FIG. 2 illustrates the elongated code bail and the keyboard and tape reader interposers cooperably juxtapositioned therewith in accordance with another aspect of the principles of the present invention.

Referring now to FIG. 2 there is shown a simplified illustration of a dual function code bail 15 in accordance with the preferred embodiment of the present invention. The code bail 15 comprises an elongated code member extending transverse to the direction of movement of a keyboard interposer 17 and a tape reader interposer 21. The respective keyboard interposer 17 and tape reader interposers 21 are arranged when actuated by the keyboard or tape reader respectively to position the lugs or stops 35 depending from the respective interposers in the path of travel of the code bail 15 during the encoding operation. As discussed in conjunction with FIG. 1 this motion during the encoding operation may comprise the direct positioning of code bails 15 by the interposers 17 or 21. Alternatively encoding bar 22 when actuated by a solenoid 24 may provide a rocking of the bails 15, 31 action during which the solenoid attempts to position the code bails in driven positions against bias. Resilient members 27 bias the code bails 15 to rest positions and when the lugs or stops 35 on the respective interposers are positioned in response to the operation of the keyboard or tape reader, the bails 15 are held or restrained by the solenoid 24 against the rocking movement of bellcranks 26 to their rest positions during the encoding operation. During an encoding operation, the position of the set of code bails 15 is sensed to generate the unique electrical code signal character which corresponds to the positioning of the code bails 15.

Referring now to FIGS. 3 and 4 there is shown the preferred embodiment of the improved tape reader in accordance with another aspect of the present invention. Applicants' tape reader 19' is adapted to sense the information markings in a perforated tape 29 and convert these individual groups of selectively positioned information apertures in a tape member into a unique positioning of a plurality of code bails 15. Code bars 21 are translatably supported on fixedly mounted rods 31 by received in slots 33 in the bars. The lugs or stops 35 depend from code bars 21 and are arranged on and spaced along the code bars in accordance with a predetermined code. A plurality of interposers 39, corresponding in number to the number of code levels of the recorded information code, carry sensing pins 41. The interposers 39 and pins 41 are arranged to travel under bias to sense the various information levels during the tape sensing portion of the cycle. In response to the full extent of travel of the pin and interposer under bias as permitted by an information aperture in the tape, shoulder 43 of interposer 39 is cooperably positioned with shoulder 45 of code bar 21. As hereinafter is to be more fully explained, the interposers 39 are rotated by a drive bail 47 to position the code bars 21 in accordance with the array of information apertures in the tape portion at the sensing station 49. In response to the positioning of the code bars 21 the mechanically positionable code bails 15 and encoding apparatus 16 convert the information into a multilevel electrical code signal which is utilizable in electronic data processing apparatus.

The perforated tape 29 to be read in applicants' tape reader is preferably stored and transported in a tape handling cartridge 51 of the type disclosed and claimed in a copending application Ser. No. 638,255, filed May 15, 1967 in the name of B. J. Malkowski, and assigned to the assignee of the present invention.

The tape cartridge 51 provides a closed transport path for the tape member 29 to be read. The resilient spring members 53 and 55 guide and secure the leading edge of the tape cartridge 51 in operable position with the sensing station 49. The tape cartridge 51 carries at its forward end a pinion 57 which in a manner hereinafter to be described provides rotational drive for the sprocket 59 of the tape cartridge which rotates the tape to transport it an information line or element at a time past the sensing station 49. With the tape cartridge 51 inserted in the tape reader the first line of information to be read is cooperably positioned at the sensing station 49. Apertures 61 of the tape-sensing station 49 provide clearance for the pin feelers 41 which sense the perforations and thus the information recorded on the tape. The tape is guided past the sensing station by the cartridge in a stepwise manner. The advancement of the tape is controlled by a reciprocally mounted rack 65 which engages the pinion 57 of the tape cartridge to advance the tape information a line at a time. Rack 65 is biased away from the pinion by spring 67. One end of the rack 65 is mounted in and carried by a pivotally mounted index link 69. Spring 71 resiliently biases the index link toward the sensing station.

A main power shaft 75 is journaled for rotation between two side frame members 77 of the tape reader. Power is selectively coupled to shaft 75 in response to the operation of clutch 79 (FIG. 4), which controls rotation of shaft 75 or gear 76 whenever it is desired to read information into the data processing apparatus via the tape reader. In the preferred embodiment it is desirable to have the keyboard 11 locked out whenever the tape reader 19 is being used and thus any appropriate clutch means known in the art may be employed to prevent the entering of information via the keyboard whenever the tape reader is in operation.

Mounted on shaft 75 are the index cams 81 and the rack-engaged cam 83. Cam followers 85 and 87 are carried by the rack 65 and index link 69 respectively to cooperate with the index cam 81 and rack-engaged cam 83 to cyclically engage the rack with the pinion of the tape cartridge thereby advancing pinion 57 one step during the oscillation cycle of index link 69. The timing of the tape advance mechanism including the rack 65 and link 69 will be hereinafter more fully explained in conjunction with FIG. 6 which illustrates the tape reader timing diagram.

As hereinabove described it is necessary to sense the various information apertures in the tape member and to convert this information into a unique mechanical positioning of the set of code bails. The position of the various ones of the code bails 15 may then be sensed by an encoder 16 to generate the approximate multilevel electrical signal. With the tape cartridge inserted into the tape reader, the portion of the information bearing tape 29 which is to be read encircles tape feed sprocket 59 and is juxtapositioned with the sensing station 49. At the sensing station a plurality of sensing pins 41 are arranged to probe the tape to read the information. The number of pins 41 is determined by the number of levels of code to be read from the tape. For example, the tape may comprise a five, six, seven, or eight level code in which the respective number of information apertures are formed in accordance with a predetermined code to represent the coded characters. The pins 41 are coupled to and carried by interposers 39. As hereinafter to be more fully explained the notch or keyway 91 of the pins 41 cooperates with a complimentary key 93 on the interposer 39 with the upper end of the pins being slidable through the apertures of the tape sensing station. Spring 95 between rod 97 and arm 99, which encircles rod 101 of the J-shaped interposer 43 biases the interposer and pin toward an upward sensing station position. Fixedly mounted rod 101 is positioned in slot 103 of the interposers. Rod 101 thus restrains the travel of the interposers 39 and pins 41 carried thereby in the biased extended position.

The travel or extent of rise of the pins 41 and thus the interposer 39 is determined by the presence or absence of an aperture at the respective information positions of the tape. In the no information or binary zero condition, the information level of the tape is solid, i.e., not apertured, and thus the pin 41 is restrained by the tape from traveling it full upward distance under the influence of bias. Conversely, in the instance whenever a binary one is present, the respective information area of the tape is apertured thereby allowing the pin to travel its full distance under the influence of its resilient bias 95. Slot 103 in the lower end of the interposer 39 corresponds to the maximum distance which the pins 41 may travel in an upward sensing direction. As hereinabove described, the code slides 21 are selectively positioned in accordance with the extent of travel permitted the various sensing pins 41 by the information tape 29. Whenever an information aperture is sensed in the tape by a particular sensor pin 41 the shoulder 93 of the associated interposer 39 is cooperably juxtapositioned to be driven during the rotation of bail 47. Shoulder 93 of the interposers 39 is arranged to cooperate with drive bail 47. Drive bail 47 is resiliently biased away from interposer 39 by spring 109. Cam follower 111 carried by drive bail 47 is arranged to cooperate with bail drive cam 113. Bail drive cam 113 is positioned on shaft 75 and arranged to be continuously cycled or driven whenever the tape reader is in operation.

The mounting of the sensing pin 41 on interposers 39 is preferably of the keyway and key type coupling which permits the individual interposers 39 to be rocked or pivoted without rotating their associated pins 41. In this manner interposers 39 are arranged to be rocked about shaft 101 in response to the operation of drive bail 47 against bias. The shoulder 43 of the interposer 39 is arranged to cooperate with shoulder 45 of slidably supported code bars 21. Whenever the sensing pin 41 is permitted to travel its full extent, i.e., an aperture is sensed in the tape, shoulder 93 is cooperably positioned with drive bail 47 thereby permitting the drive bail to rock the interposer about shaft 101. During the driven motion of drive bail 47, the shoulder 43 of interposer 39 contacts shoulder 45 of code bar 21 thereby urging it against bias. Conversely, whenever a sensor pin 41 is not permitted to travel its full distance, i.e., the tape in that area is not apertured, shoulder 93 of interposer 39 is below and not cooperably juxtapositioned with shoulder 45 and thus the interposer shoulder 43 is ineffective to transmit the motion of the drive bail 47 to the code bar 21.

As is known in the art the feeler pins 41 must be withdrawn from their extended sensing position before the information tape is to be advanced. As hereinabove described rack 65 and index link 69 under the control of the index and rock engage cams 81 and 83 cooperably position rack 65 with the pinion 57 of the tape cartridge. In this manner the pinion 57 is rotated a distance, for example one notch, corresponding to the distance the tape travels between adjacent information positions. After the drive bail 47 has completed the positioning of code bars 21 in response to the individual positioning of the sensor pins 41 as permitted by the information apertures in the tape, the pins 41 must be withdrawn and the tape 29 advanced to juxtaposition in next information line at the sensing station 49. Restoring bail 121 which is rockably supported on shaft 123 is arranged to control the withdrawing of the pins 41 prior to the tape-indexing operation. A restoring cam 125 carried by shaft 75 cooperates with a cam follower 127 carried by the restoring bail 121. During the driven operation of restoring bail 121 under the control of restoring cam 125, the restoring bail 121 cooperates with the shoulders 129 of the interposers 39. In this manner the movement of the restoring bail 121 against bias urges the interposers 39 and pins 41 carried thereby against bias into the withdrawn position. In this manner the pins 41 are withdrawn from the information-sensing position thereby permitting the advancement of the tape without injury to the tape member.

Referring now to FIGS. *5a* and *5b* there is shown various structural details of the preferred embodiment of the tape reader interposer 39 which have a plurality of degrees of freedom. The tape to be read is positioned at the sensing station by sprocket 59 of the hereinabove described tape cartridge. Sensor pins 41 are arranged to probe the tape and individually travel a predetermined distance under bias whenever an information aperture is encountered. Each sensor pin 41 is slidably carried by an interposer 39 and the two are arranged to travel upwardly toward the sensing station under the influence of spring 95.

As shown in FIG. *5a* the shoulder 129 of interposer 39 cooperates with restoring bail 121 to restore the sensor pin 41 and interposer against bias. As shown, the interposer 39 is in its biased, undriven position and thus the code bars 21 and code bails 15 are in their normal, biased rest position. In this position the sensing pin 41 is carried on the portion of the key 93 of interposer 39 proximate the shoulder 43.

Referring now to FIG. *5b* it will be seen that with the sensor pin 41 in its fully extended sensing position, shoulder 43 of interposer 39 is cooperatively positioned with shoulder 45 of code bar 21. Likewise, with the drive bail 47 in its drive position, as shown in FIG. *5b*, the end 94 of the interposer shoulder 93 is cooperatively positioned with and the interposer is rocked by the drive bail 47. Thus the interposer 39 rotated by the drive bail 47 urges the code bars 21 against bias. With the interposer 39 rotated by the drive bail 47 to its driver position FIG. *5b*, it can be seen that the sensor pin 41 remains stationary in its extended position. The key 93 and keyway coupling 91 of pin 41 to interposer 39 permits the interposer 39 to be rotated relative to the pin 41 while the pin 41 remains stationary, i.e., does not rotate. As shown, the key 93 of interposer 43 is preferably arcuate in shape thereby facilitating the rotation of the interposer about rod 101 while the pin 41 remains stationary in its extended position.

The lugs 35 of the code bars 21 as hereinabove described in conjunction with FIG. 2 may be utilized to stop, restrain or arrest the driven movement of code bails 15 during an encoding cycle. Alternately, the lugs 35 may be employed to directly position the code bails 15 to an encoding position whenever the respective code bars 21 are driven against bias by the rotation of the interposer 39 positioned as shown in FIG. *5b*.

Referring now to FIG. 6 there is shown a timing diagram of the cams 81, 83, 113 and 125 and mechanisms controlled thereby for the preferred embodiment of applicants' tape reader. While the embodiment shown in FIGS. 3 and 4 accomplishes two information-sensing operations per revolution of shaft 75, for simplicity only one cycle of operation is shown in FIG. 6. With the first information line of the tape 29 to be read cooperably positioned at the sensing station 49, shaft 75 rotates to begin the sensing operation. As shown in curve C, which illustrates the movement of the restoring bail 121, the sensing pins begin to move at approximately the 2° rotation position of shaft 75 from a home position. The initial counterclockwise motion of the restoring bail 121 permits the pins 41 to extend or rise under bias to the sensing position. With the pins in the extended, information-reading position, the drive bail 47, as shown in curve D, begins its initial clockwise movement. The selective positioning of the code bails 15 is accomplished approximately from the 35° to 61° position of the shaft 75 in accordance with the information sensed by the two respective pins 41. After the drive bail 47 has traveled its full extent against bias thereby positioning the code bar members 21 in accordance with the positioning of interposers 39, the drive bail 47 begins its counterclockwise motion under the influence of spring 109 as shown in FIG. 4. Thereafter the restoring bail 121, a shown in curve C, begins its counterclockwise motion withdrawing the sensing pins 41 from the reading to the retracted position. In this manner the information in the tape is converted into the mechanical positioning of the code slides 21 and code bails 15.

With reference to curves A and B of FIG. 6, showing the movement of the index link 87 and rack 65, it may be seen that during the information-sensing operation the tape advance operation is begun. During the information-reading operation the rack 65, as shown in curve A, begins its counterclockwise motion to disengage the rack from the pinion 57 of the tape cartridge. With the rack disengaged, the index link 87, as shown in curve B, begins its counterclockwise motion under bias to position the rack in its extended position to engage the pinion of the tape cartridge. As shown in curve A the clockwise motion of the rack 65 against bias engages the rack with the pinion readying it for its next operation. Thus after the information has been read and the pins retracted, as shown in curves C and D, the counterclockwise movement of the index rack advances the pinion engaged by the rack one notch thereby positioning the next information line at the information sensing station. With reference to curve E, it may be seen that the code bars are held in the driven position for the period roughly corresponding to the clockwise motion of the drive bail, i.e., approximately the 35° to 61° interval. With the reading of the information complete, and the retraction of the pins (curve C), the tape advance mechanism, i.e., index link 87 and rack 65 (curves A and B), cooperate to advance the tape to ready the reader for the next reading operation. The single-reading cycle, including the advancement of the tape to the next reading position, occupies less than 180° rotation of the shaft and therefore it is possible to accomplish two reading cycles per revolution of the shaft.

We claim:

1. A reader for reading information from a perforated tape comprising:

a read station having a plurality of guide apertures over which a punched tape is step fed successively to present one or more information representative apertures of a binary code in alignment with corresponding ones of the guide apertures;

a plurality of pins respectively guided by said guide apertures and biased to move through tape apertures at the station, the pins passing through the tape apertures having extended movement;

first cyclically operable means operable alternately to retract and release said pins;

means operable between retraction and release of said pins to feed the tape one step;

a plurality of translatably mounted parallel code bars extending respectively and laterally from said pins;

second cyclically operable means operable to move said code bars; and a plurality of pivoted interposers respectively movable relative to their pivots with said pins and movable with the extended ones of said pins to positions operatively connecting said second cyclically operable means with corresponding ones of said code bars.

2. A reader as defined by claim 1 wherein, said pins and said interposers being linearly movable together by said first cyclically operable means and said interposers being pivotal relative to said pins by and upon operation of said second cyclically operable means.

3. A reader for reading information represented by a binary coded arrangement of apertures in a tape comprising:

means defining a reading station having guide apertures over which a tape is step fed to successively present one or more tape apertures in registration respectively with the guide apertures;

a plurality of pins slidably guided respectively in said guide apertures and individually biased to sense the presence and absence of information apertures in the tape, the presence of apertures in the tape effecting an extended range of movement of those ones of the pins in registry with the tape apertures;

means operable to intermittently impart stepwise movement of the tape to the reading station;

a plurality of translatably supported code bars extending respectively laterally from said pins, said code bars biased toward said pins to rest position;

a plurality of bails extending transversely to said code bars and respectively rotated by said code bars when said code bars are moved against bias;

a plurality of transducers respectively operatively connected to said bails;

drive means operable to move said code bars from their rest positions to rotate said bails;

a plurality of interposers coupled respectively to said pins for linear movement together by the bias and coupled for lateral displacement relative to said pins, ones of said interposers of the extended pins positioned to operatively connect said drive means to corresponding ones of said code bars; and means cooperable with said interposers to retract said pins and operable prior to the intermittent advancement of the tape by said operable means.

4. The tape reader defined in claim 3 additionally including means for intermittently advancing said tape past a sensing station; and restoring means for withdrawing said pins from a sensing position against bias.

5. A perforated tape reader cooperable with a tape bearing cartridge insertable therein, said cartridge including a pinion for imparting rotational drive to a tape member encircling a sprocket coupled to the pinion, said reader comprising:

reciprocable rack means for intermittently imparting stepwise motion to said pinion intermediate adjacent reading operations;

a set of translatably supported mechanically positionable code slides, each slide having at least one depending lug, said lugs being positioned along the length of one of said code slides in accordance with a predetermined code;

resilient means for biasing said code slides to a rest position;

sensing means including a plurality of resiliently biased feeler pins for sensing the presence and absence of information apertures at respective information levels of the tape at the sensing station;

drive means for urging said code slides from a rest position to a biased position;

interposer means having at least 2° of freedom for sensing the extent of travel of said individual ones of said pins under bias and for mechanically coupling said drive means to ones of said code slides, said ones of said code slides corresponding in accordance with a predetermined coding scheme to ones of said pins which have traveled a predetermined extent under bias;

a plurality of code cyclically resilient means for biasing said code bails to a rest position;

encoding power means for cyclically urging said code bails against bias, the movement of said code bails responsive to said encoding power means being determined by the respective positioning of ones of said lugs carried by said code slides; and means cooperable with said interposer means for withdrawing said pins against bias intermediate successive sensing operations.

6. A reader for reading information from a perforated tape comprising:

a stationary guide member having a guide aperture to which an information-representing aperture in a tape is presented in registry therewith;

a pin guided in said guide member aperture and biased for movement to a position extending through the aperture in the tape;

a first cyclically operable actuator operable to alternately retract and release said pin;

a pivotally mounted interposer biased from a retracted position toward its fulcrum in the direction of movement of said pin through the tape aperture and rockable about its fulcrum to a position indicative of the presence of a tape aperture at said guide member;

a second cyclically operable actuator operable to rock said interposer subsequent to the sensing of the tape aperture by said pin;

coupling means on said pin and on said interposer cooperable to effect movement of said pin and said interposer together and the rocking of said interposer relative to said pin and transducing means for signalling the sensing of an information aperture in the tape by the pin including a part responsive to the rocking movement of the interposer only when the interposer is jointly moved with the pin to the pin's aperture-sensing position.

7. A reader as defined by claim 6 wherein said coupling means comprises a keyway on and transverse to said pin and an arcuate key on said interposer engaging in said keyway.

8. A reader as defined by claim 6 wherein said interposer extends between its fulcrum and said pin lengthwise of the axis of said pin, a transversely extending head on said interposer laterally of said pin, and an arcuate key on said head engaging a keyway on said pin.

PO-1050
(5/69)

UNITED STATES PATENT OFFICE
CERTIFICATE OF CORRECTION

Patent No. 3,562,493 Dated February 9, 1971

Inventor(s) Bernard J. Malkowski and John E. Hylan

It is certified that error appears in the above-identified patent and that said Letters Patent are hereby corrected as shown below:

Col. 2, line 59, change "determine to the position" to --determine the position--.

Col. 3, line 4, change "rocking of" to --rocking action o
line 4, change "31 action" to --31 during--;
line 25, change "31 by received" to --31 received- Col. 4, line 52, change "it full" to --its full--.

Col. 6, line 37, change "a shown" to --as shown--.

Col. 8, line 23, change "a plurality of code cyclically" t --a plurality of code bails;--.

Signed and sealed this 29th day of June 1971.

(SEAL)
Attest:

EDWARD M.FLETCHER,JR.
Attesting Officer

WILLIAM E. SCHUYLER, JR.
Commissioner of Patents